United States Patent
Hsu et al.

(10) Patent No.: US 9,439,012 B2
(45) Date of Patent: Sep. 6, 2016

(54) METHOD AND APPARATUS FOR AUDIO TESTING

(71) Applicant: Wistron Corporation, New Taipei (TW)

(72) Inventors: Ying-Chieh Hsu, New Taipei (TW); Shaw-Renn Hwang, New Taipei (TW)

(73) Assignee: Wistron Corporation, New Taipei (TW)

( * ) Notice: Subject to any disclaimer, the term of this patent is extended or adjusted under 35 U.S.C. 154(b) by 216 days.

(21) Appl. No.: 14/295,346

(22) Filed: Jun. 4, 2014

(65) Prior Publication Data

US 2015/0195662 A1 Jul. 9, 2015

(30) Foreign Application Priority Data

Jan. 9, 2014 (TW) .............................. 103100841 A (51) Int. Cl.
*H04R 29/00* (2006.01)
*H04M 3/26* (2006.01)
*H04M 3/24* (2006.01)

(52) U.S. Cl.
CPC ............ *H04R 29/00* (2013.01); *H04M 3/24* (2013.01); *H04M 3/26* (2013.01); *H04R 2430/03* (2013.01)

(58) Field of Classification Search
None
See application file for complete search history.

(56) References Cited

U.S. PATENT DOCUMENTS

| 2003/0112981 A1* | 6/2003 | McWilliam .......... G10K 11/178 381/71.11 |
| 2006/0039568 A1 | 2/2006 | Lee et al. |
| 2012/0155661 A1* | 6/2012 | Ma ....................... H04L 67/125 381/58 |
| 2013/0142346 A1 | 6/2013 | Yang et al. |
| 2013/0243204 A1 | 9/2013 | Kao et al. |

FOREIGN PATENT DOCUMENTS

| TW | I241830 | 10/2005 |
| TW | 201111811 | 4/2011 |

OTHER PUBLICATIONS

"Office Action of Taiwan Counterpart Application" with partial English translation, issued on May 5, 2016, p. 1-p. 9.

* cited by examiner

*Primary Examiner* — Curtis Kuntz
*Assistant Examiner* — Kenny Truong
(74) *Attorney, Agent, or Firm* — Jianq Chyun IP Office (57) ABSTRACT

A method and an apparatus for audio testing are provided. The method is adapted to an electronic device with a first and second audio receive devices and a first and second audio send devices. The method includes following steps. A first and second audio testing signals are sent to the first and second audio receive devices of the electronic device. The electronic device has a first loop forming by connecting the first audio receive device and the first audio send device electrically, and has a second loop forming by connecting the second audio receive device and the second audio send device electrically. The first and second audio send devices send a first and second response signals respectively. The first and second response signals are received and analyzed to test functions of the first and second audio receive devices and the first and second audio send devices.

12 Claims, 6 Drawing Sheets

METHOD AND APPARATUS FOR AUDIO TESTING

CROSS-REFERENCE TO RELATED APPLICATION

This application claims the priority benefit of Taiwan application serial no. 103100841, filed on Jan. 9, 2014. The entirety of the above-mentioned patent application is hereby incorporated by reference herein and made a part of this specification.

BACKGROUND

1. Technical Field

The invention relates to a testing technique of an electronic equipment. Particularly, the invention relates to a method and an apparatus for audio testing.

2. Related Art

Along with development and progress of technology, network has gradually become a main communication channel in daily life. By using Internet protocol (IP) phones, communication between people is no longer restricted by distance or environment. Many manufacturers have researched and developed dedicated telephones in allusion to functions of the IP phone, and expect that the IP phones are as popular as today's general telephones.

In the past, when the functions of the telephone are tested, a tester has to stay in a soundproof room, and uses a high-cost artificial mouth, an artificial ear and a data acquisition (DAQ) card to play pre-stored voice files, so as to test an audio receiving function and an audio sending function of the IP phone. However, the above testing method is only adapted to test finished products of the IP phone, and cannot be applied to a production line of the IP phone. On the other hand, since a testing environment of the IP phone is in the soundproof room without noise other than a noisy manufacturing plant, the above testing method cannot be applied in the manufacturing plant. Therefore, how to test the audio receiving quality and audio sending quality of the telephone with a low cost is an important problem to be resolved.

SUMMARY

The invention is directed to a method and an apparatus for audio testing, by which functions of an Internet protocol (IP) phone can be tested in a noisy environment by using low-level testing equipment.

The invention provides a method for audio testing, which is adapted to test an electronic device with a first audio receiving device, a second audio receiving device, a first audio sending device and a second audio sending device. The method includes following steps. A first audio testing signal and a second audio testing signal are sent to the first audio receiving device and the second audio receiving device of the electronic device. The electronic device has a first loop formed by electrically connecting the first audio receiving device and the first audio sending device. The electronic device has a second loop formed by electrically connecting the second audio receiving device and the second audio sending device. The first audio testing signal and the second audio testing signal respectively have a specific frequency. The first audio sending device and the second audio sending device respectively send a first response signal and a second response signal, where the first response signal and the second response signal are generated in response to the first audio testing signal and the second audio testing signal respectively passing through the first loop and the second loop. The first response signal and the second response signal are received and analyzed to test functions of the first audio receiving device, the second audio receiving device, the first audio sending device and the second audio sending device.

In an embodiment of the invention, the method for audio testing further includes randomly selecting a specific frequency from a selected range, and generating the first audio testing signal and the second audio testing signal according to the specific frequency.

In an embodiment of the invention, the step of receiving and analyzing the first response signal and the second response signal to test the functions of the first audio receiving device, the second audio receiving device, the first audio sending device and the second audio sending device includes following steps. A first difference value and a second difference value are respectively calculated by subtracting an environment reference signal from the first response signal and the second response signal. When the first difference value and the second difference value are greater than a threshold, it represent that the functions of the first audio receiving device, the second audio receiving device, the first audio sending device and the second audio sending device are normal. When the first difference value and the second difference value are smaller than the threshold, the specific frequency of the first audio testing signal and the second audio testing signal is changed and the method for audio testing is repeated.

The invention provides an audio testing apparatus including an audio processing unit, an electronic device and a testing unit. The audio processing unit has a first output terminal, a second output terminal, a first input terminal and a second input terminal. The electronic device is coupled to the audio processing unit, and has a first audio receiving device, a second audio receiving device, a first audio sending device and a second audio sending device. The first audio receiving device is electrically connected to the first audio sending device through a first loop, and the second audio receiving device is electrically connected to the second audio sending device through a second loop. The audio processing unit respectively sends a first audio testing signal and a second audio testing signal to the first audio receiving device and the second audio receiving device of the electronic device through the first output terminal and the second output terminal. The first audio testing signal and the second audio testing signal respectively have a specific frequency. The audio processing unit respectively receives a first response signal and a second response signal from the first audio sending device and the second audio sending device of the electronic device through the first input terminal and the second input terminal. The first response signal and the second response signal are generated in response to the first audio testing signal and the second audio testing signal respectively passing through the first loop and the second loop. The testing unit is coupled to the electronic device and the audio processing unit, and the testing unit respectively analyzes the first response signal and the second response signal received by the audio processing unit to test functions of the first audio receiving device, the second audio receiving device, the first audio sending device and the second audio sending device.

In an embodiment of the invention, the audio processing unit randomly selects a specific frequency from a selected range, and generates the first audio testing signal and the second audio testing signal according to the specific frequency.

In an embodiment of the invention, the testing unit respectively calculates a first difference value and a second difference value by subtracting an environment reference signal from the first response signal and the second response signal. When the first difference value and the second difference value are greater than a threshold, it represent that the function of the first and second audio receiving devices and the first and second audio sending devices is normal. When the first difference value and the second difference value are smaller than the threshold, the audio processing unit respectively changes the specific frequency of the first audio testing signal and the second audio testing signal.

According to the above descriptions, in the method and the apparatus for audio testing of the invention, the first and second audio testing signals are sent to the electronic device, and the first and second response signals transmitted by the electronic device in response to the first and second audio testing signals are analyzed to test the function of the first and second audio receiving devices and the first and second audio sending devices of the electronic device. In the aforementioned method, the first and second audio testing signals with randomly selected specific frequencies are used to test the electronic device to reduce a chance of test error. On the other hand, in order to test the electronic device under a noisy environment, in the method for audio testing of the invention, the first and second response signals transmitted by the electronic device are compared with the environment reference signal to decrease an influence caused by the environmental noise during the testing process, so as to improve testing accuracy. Moreover, the method and the apparatus for audio testing of the invention can test the audio receiving and audio sending functions of the electronic device by using a low-level testing equipment, so as to decrease a test cost.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

According to a method and an apparatus for audio testing of the invention, general sound cards, microphones and speakers can be used to quickly detect whether an audio receiving function and an audio sending function of an Internet protocol (IP) phone are normal under a noisy environment (for example, a production line or a plant). In this way, a testing speed is accelerated and the test cost is decreased. Moreover, the audio testing apparatus of the invention randomly selects an audio frequency from a specific audio range, and test the equipment to be tested by using the randomly selected audio frequency, so as to obtain a test result.

Figure 1:
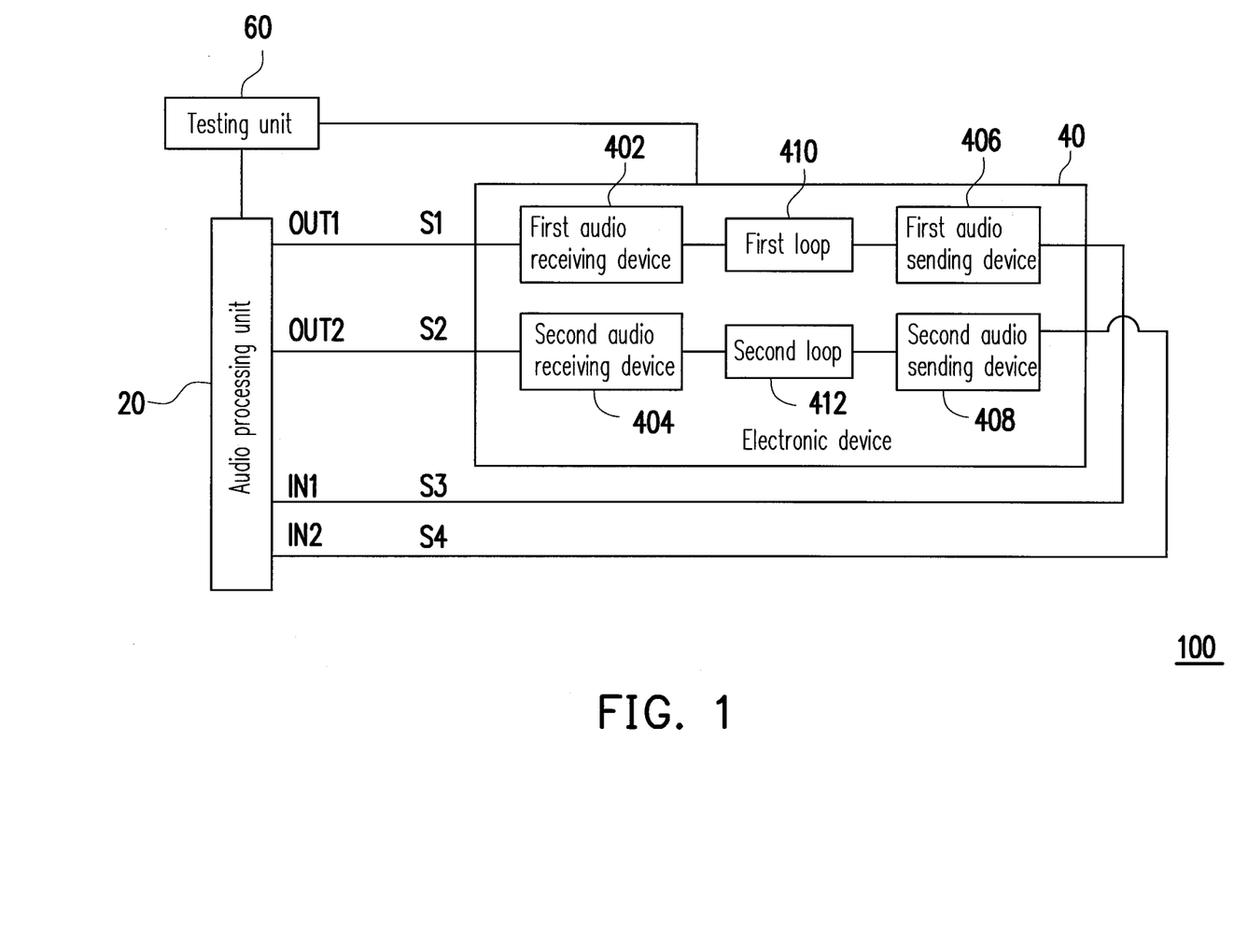
FIG. 1 is a block diagram of an audio testing apparatus 100 according to an embodiment of the invention.

FIG. 1 is a block diagram of an audio testing apparatus 100 according to an embodiment of the invention. The audio testing apparatus 100 includes an audio processing unit 20, an electronic device 40 to be tested and a testing unit 60. The audio processing unit 20 has a first output terminal OUT1, a second output terminal OUT2, a first input terminal IN1 and a second input terminal IN2. For example, the audio processing unit 20 can be a sound card having two signal output terminals and two signal input terminals. The electronic device 40 is coupled to the audio processing unit 20, and includes a first audio receiving device 402, a second audio receiving device 404, a first audio sending device 406 and a second audio sending device 408.

The electronic device 40 to be tested can be an IP phone or a circuit board device having an audio receiving terminal and an audio sending terminal. The first audio receiving device 402 and the second audio receiving device 404 can be microphones or any electronic product having an audio receiving function or audio receiving terminals. The first audio sending device 406 and the second audio sending device 408 can be loudspeakers or other any electronic products having audio sending functions or audio sending terminals. It should be noticed that in other embodiments of the invention, the electronic device 40 may have a plurality of audio receiving devices and a plurality of audio sending devices according to an actual requirement, and the number of the audio receiving devices and the audio sending devices in the electronic device 40 is not limited by the invention.

The testing unit 60 is coupled to the electronic device 40 and the audio processing unit 20. The testing unit 60 can be a central processing unit (CPU), a programmable microprocessor, a digital signal processor (DSP), a programmable controller, an application specific integrated circuit (ASIC), a programmable logic device (PLD) or other hardware devices having a computation function.

Figure 2A:
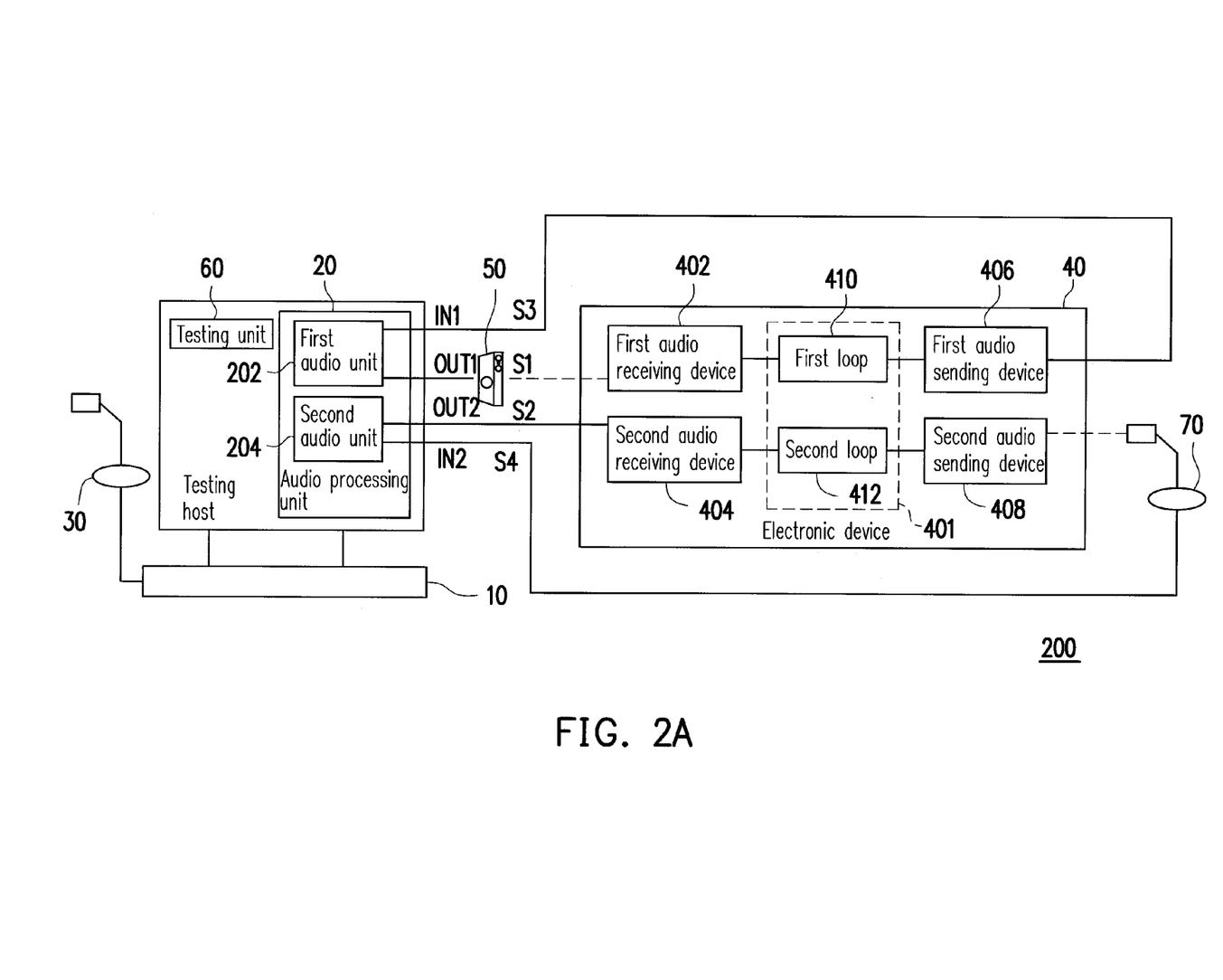
FIG. 2A is a schematic diagram of an audio testing apparatus 200 according to an embodiment of the invention.
Figure 2B:
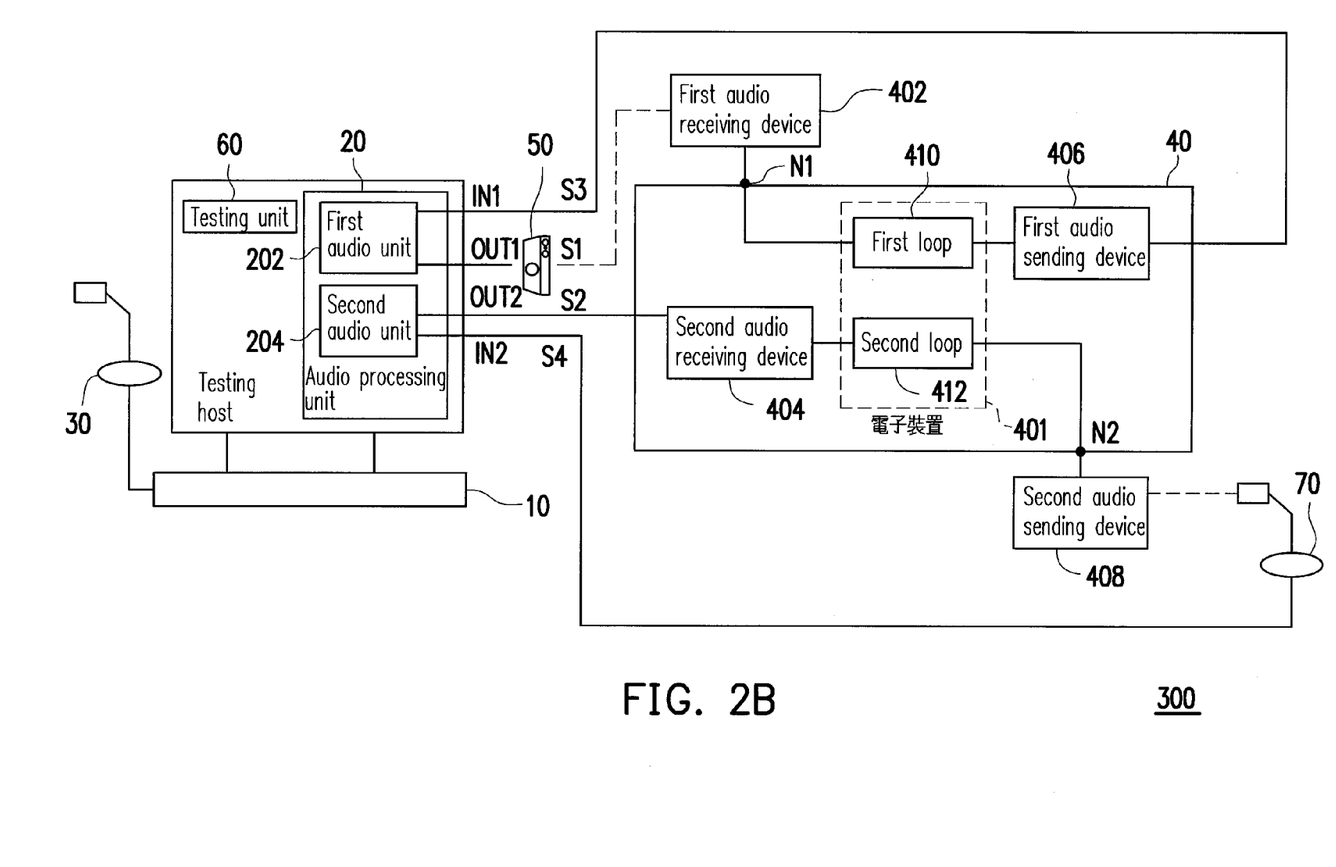
FIG. 2B is a schematic diagram of an audio testing apparatus 300 according to another embodiment of the invention.

FIG. 2A is a schematic diagram of an audio testing apparatus 200 according to an embodiment of the invention. FIG. 2B is a schematic diagram of an audio testing apparatus 300 according to another embodiment of the invention. Referring to FIG. 1, FIG. 2A and FIG. 2B, the audio testing apparatus 200 and the audio testing apparatus 300 respectively include a testing host 10, a first microphone 30, an electronic device 40, a loudspeaker 50 and a second microphone 70. The testing host 10 can be a desktop computer, a notebook computer or other electronic product having a computation function and an audio sending function, and the audio processing unit 20 and the testing unit 60 of FIG. 1 can be integrated thereto (shown in FIG. 2A and FIG. 2B). The audio processing unit 20 includes a first audio unit 202 and a second audio unit 204. The first microphone 30 can be a directional microphone, which is coupled to the testing host 10 and receives an environmental sound for storing in the testing host 10. The loudspeaker 50 can be a speaker, and is used for transmitting signals sent by the first audio unit 202. The second microphone 70 can be a standing microphone, which is coupled to the second audio unit 204 and is used for transmitting the signal received by the second audio sending device 408 to the second audio unit 204. On the other hand, functions and operation methods of the electronic device 40 and the testing unit 60 are as that described with reference of FIG. 1, and details thereof are not repeated. A difference between FIG. 2A and FIG. 2B lies in configuration methods of the first audio receiving device 402 and the first audio sending device 406. The audio receiving devices 402 and 404 and the audio sending devices 406 and 408 can be disposed within a casing of the electronic device 40, for example, microphones and audio playing speakers embedded in the telephone (the electronic device 40). The audio receiving devices 402 and 404 and the audio sending devices 406 and 408 can also be selectively disposed outside the casing of the electronic device 40 according to an actual requirement, and transmit audio signals through an audio receiving terminal and an audio sending terminal of the electronic device 40, as shown in FIG. 2B. For example, the telephone (the electronic device 40) can be respectively connected to an external microphone (the first audio receiving device 402) and an external speaker (the second audio sending device 408) through an audio receiving terminal N1 and an audio sending terminal N2. In other words, configuration of the first audio receiving device 402, the second audio receiving device 404, the first audio sending device 406 and the second audio sending device 408 is not limited by the invention.

Figure 3:
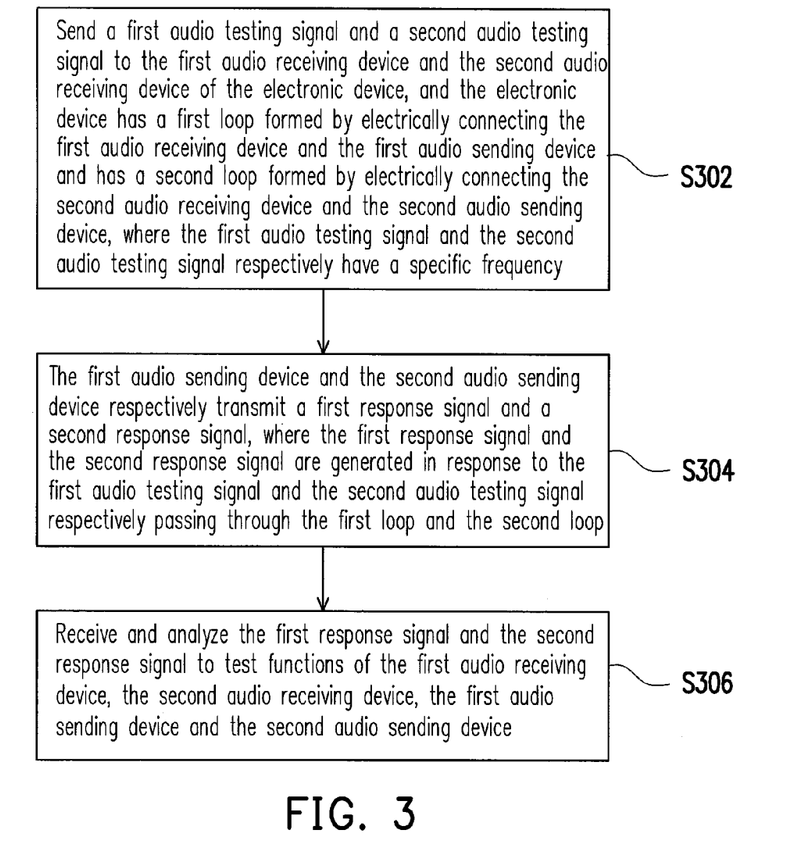
FIG. 3 is a flowchart illustrating a method for audio testing according to an embodiment of the invention.

FIG. 3 is a flowchart illustrating a method for audio testing according to an embodiment of the invention. Referring to FIG. 1, FIG. 2A, FIG. 2B and FIG. 3, in the present embodiment of the invention, the method for audio testing of FIG. 3 is adapted to the electronic device 40 having the first audio receiving device 402, the second audio receiving device 404, the first audio sending device 406 and the second audio sending device 408. First, in step S302, the audio processing unit 20 sends a first audio testing signal S1 and a second audio testing signal S2 to the first audio receiving device 402 and the second audio receiving device 404 of the electronic device 40. The electronic device 40 has a first loop 410 formed by electrically connecting the first audio receiving device 402 and the first audio sending device 406 and has a second loop 412 formed by electrically connecting the second audio receiving device 404 and the second audio sending device 408. The first loop 410 and the second loop 412 can be generated by an internal chip 401. The first audio testing signal S1 and the second audio testing signal S2 respectively have a specific frequency. In the present embodiment, the first audio testing signal S1 and the second audio testing signal S2 are randomly generated sine wave audio signals having a specific frequency. It is known that when the air is used as a propagating medium, the audio signal is mainly composed of sine waves. In other embodiments, if the electronic device 40 transmits audio signals through various audio transmission terminals, the audio signals are converted into a digital form.

For example, when the tester wants to detect whether an audio receiving function and an audio sending function of the IP phone are normal, the tester can first connect a testing equipment (for example, the testing host 10) with the IP phone (for example, the electronic device 40) through physical lines. In the present embodiment, the IP phone has two receiving terminals (for example, the first audio receiving device 402 and the second audio receiving device 404) and two transmitting terminals (for example, the first audio sending device 406 and the second audio sending device 408). It should be noticed that before the audio processing unit 20 transmits the first audio testing signal S1 and the second audio testing signal S2, the electronic device 430 controls the internal chip 401 of the electronic device 40 to form the first loop 410 and the second loop 412 through software programs, so as to respectively connect the first audio receiving device 402 with the first audio sending device 406 and connect the second audio receiving device 404 with the second audio sending device 408. On the other hand, when the testing host 10 does not test the electronic device 40, the electronic device 40 controls the internal chip 401 of the electronic device 40 to cut off the first loop 410 and the second loop 412 through software programs. In other words, the first loop 410 and the second loop 412 are only generated and connected when the audio receiving devices and the audio sending devices in the electronic device 40 are tested. When testing of the electronic device 40 is not started, or testing of the electronic device 40 is finished, the internal chip 401 cuts off the first loop 410 and the second loop 412.

Then, in step S304, the first audio sending device 406 and the second audio sending device 408 respectively transmit a first response signal S3 and a second response signal S4. The first response signal S3 and the second response signal S4 are generated in response to the first audio testing signal S1 and the second audio testing signal S2 respectively passing through the first loop 410 and the second loop 412. Finally, in step S306, the testing unit 60 receives and analyzes the first response signal S3 and the second response signal S4 to test whether functions of the first audio receiving device 402, the second audio receiving device 404, the first audio sending device 406 and the second audio sending device 408 are normal. For example, when the tester wants to test a function of an audio receiving terminal of the IP phone, a computer can randomly send a sine wave audio signal with a specific frequency (for example, the first audio testing signal S1) through a sound card (for example, the first audio unit 202 of the audio processing unit 20), and the IP phone can directly (for example, the first output terminal OUT1 of the audio processing unit 20 of FIG. 1 is coupled to the first audio receiving device 402) or indirectly (for example, the testing host 10 of FIG. 2A or FIG. 2B send sounds through the loudspeaker 50, and the electronic device 40 detects the sound signal through air) receive the audio signal through the first audio receiving device 402. After the electronic device 40 receives the first audio testing signal S1, the electronic device 40 generates the first response signal S3 in response to the first audio testing signal S1. Then, the electronic device 40 transmits the first response signal S3 to the first input terminal IN1 of the audio processing unit 20 through the first loop 410 and the first audio sending device 406. Finally, the testing unit 60 analyzes the first response signal S3 received by the audio processing unit 20 to determine whether the audio receiving function of the IP phone is normal. It should be noticed that when the testing host 10 sends sound through the loudspeaker 50, and the electronic device 40 detects the sound signal through the air, a sound volume of the loudspeaker 50 is preferably turned up to the maximum to distinguish the sound signal sent by the loudspeaker 50 from the ambient noise.

On the other hand, if the tester wants to test a function of the audio sending terminal of the IP phone, the computer can randomly send a sine wave audio signal with a specific frequency (for example, the second audio testing signal S2) through a sound card (for example, the second audio unit 204 of the audio processing unit 20), and the IP phone can receive the audio signal through the second audio receiving device 404. After the electronic device 40 receives the second audio testing signal S2, the electronic device 40 generates the second response signal S4 in response to the second audio testing signal S2. Then, the electronic device 40 directly (the second audio sending device 408 of FIG. 1 is coupled to the second input terminal IN2 of the audio processing unit 20) or indirectly (for example, the second audio sending device 408 of FIG. 2A or FIG. 2B can be a loudspeaker having a left and right sound channels or a mono channel, and the audio testing apparatus 200 may use the second microphone 70 connected to the second input terminal IN2 of the audio processing unit 20 to receive the second response signal S4 sent by the second audio sending device 408) transmits the second response signal S4 to the second input terminal IN2 of the audio processing unit 20 through the second loop 412 and the second audio sending device 408. Finally, the testing unit 60 analyzes the second response signal S4 received by the audio processing unit 20 to determine whether the audio sending function of the IP phone is normal.

Figure 4:
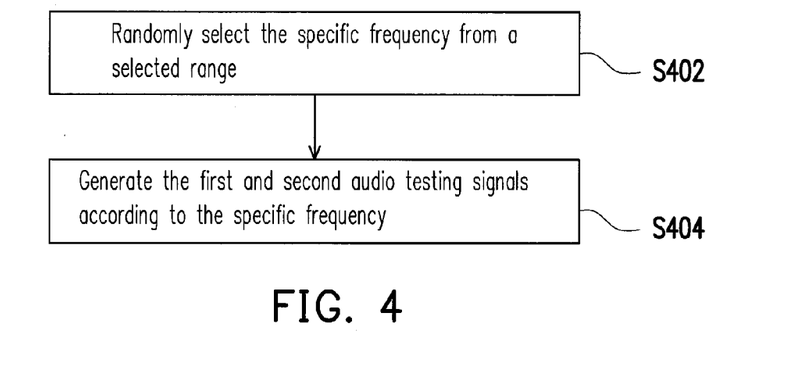
FIG. 4 is a flowchart illustrating a method for generating an audio testing signal according to an embodiment of the invention.

A method for generating the first audio testing signal S1 and the second audio testing signal S2 mentioned in the step S302 is described below. FIG. 4 is a flowchart illustrating a method for generating an audio testing signal according to an embodiment of the invention. Referring to FIG. 4, first, in step S402, the audio processing unit 20 randomly selects a specific frequency from a selected range. For example, the testing unit 60 can randomly select frequencies of the first audio testing signal S1 and the second audio testing signal S2 from the selected range (for example, 1K-2K Hz) through the audio processing unit 20. Then, in step S404, the audio processing unit 20 generates the first audio testing signal S1 and the second audio testing signal S2 according to the specific frequency. It should be noticed that in the present embodiment of the invention, the first output terminal OUT1 and the second output terminal OUT2 of the audio processing unit 20 can simultaneously generate the first audio testing signal S1 and the second audio testing signal S2. In other embodiments, it is unnecessary to simultaneously generate the first audio testing signal S1 and the second audio testing signal S2, and the first output terminal OUT1 and the second output terminal OUT2 of the audio processing unit 20 can select to output one of the first audio testing signal S1 and the second audio testing signal S2 or sequentially output the same. According to another aspect, the tester can respectively or simultaneously test the functions of the audio receiving terminal and the audio sending terminal of the IP phone.

Figure 5:
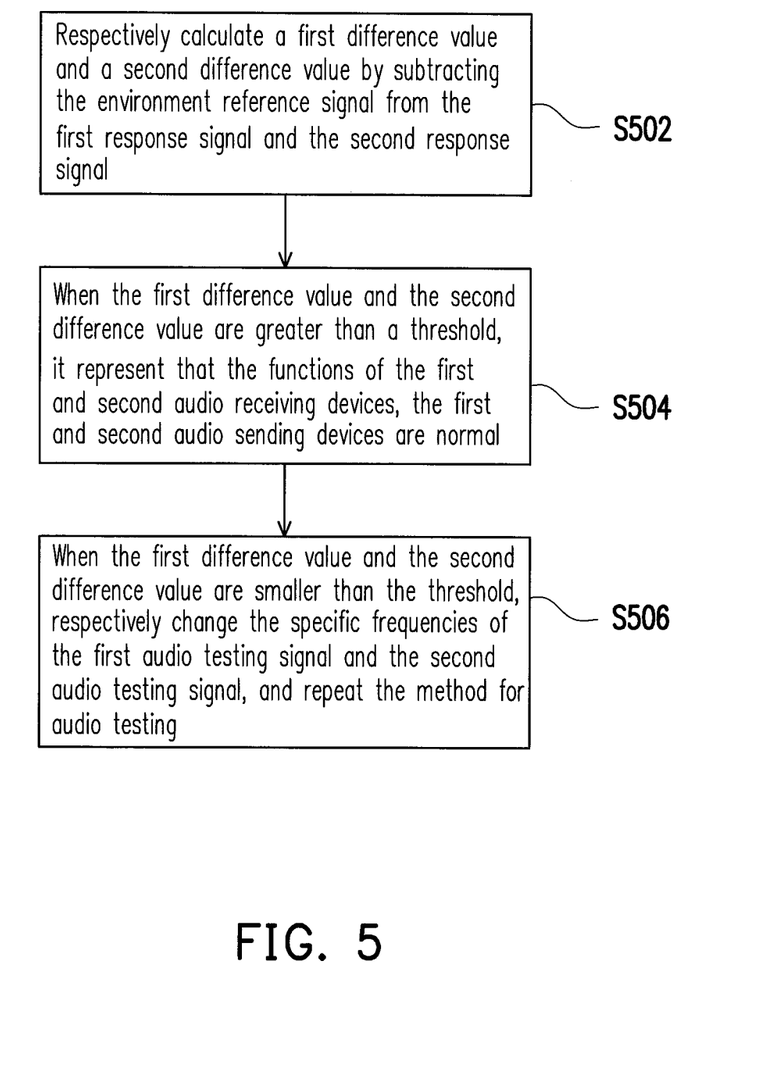
FIG. 5 is a flowchart illustrating a method for analysing a response signal according to an embodiment of the invention.
Figure 6:
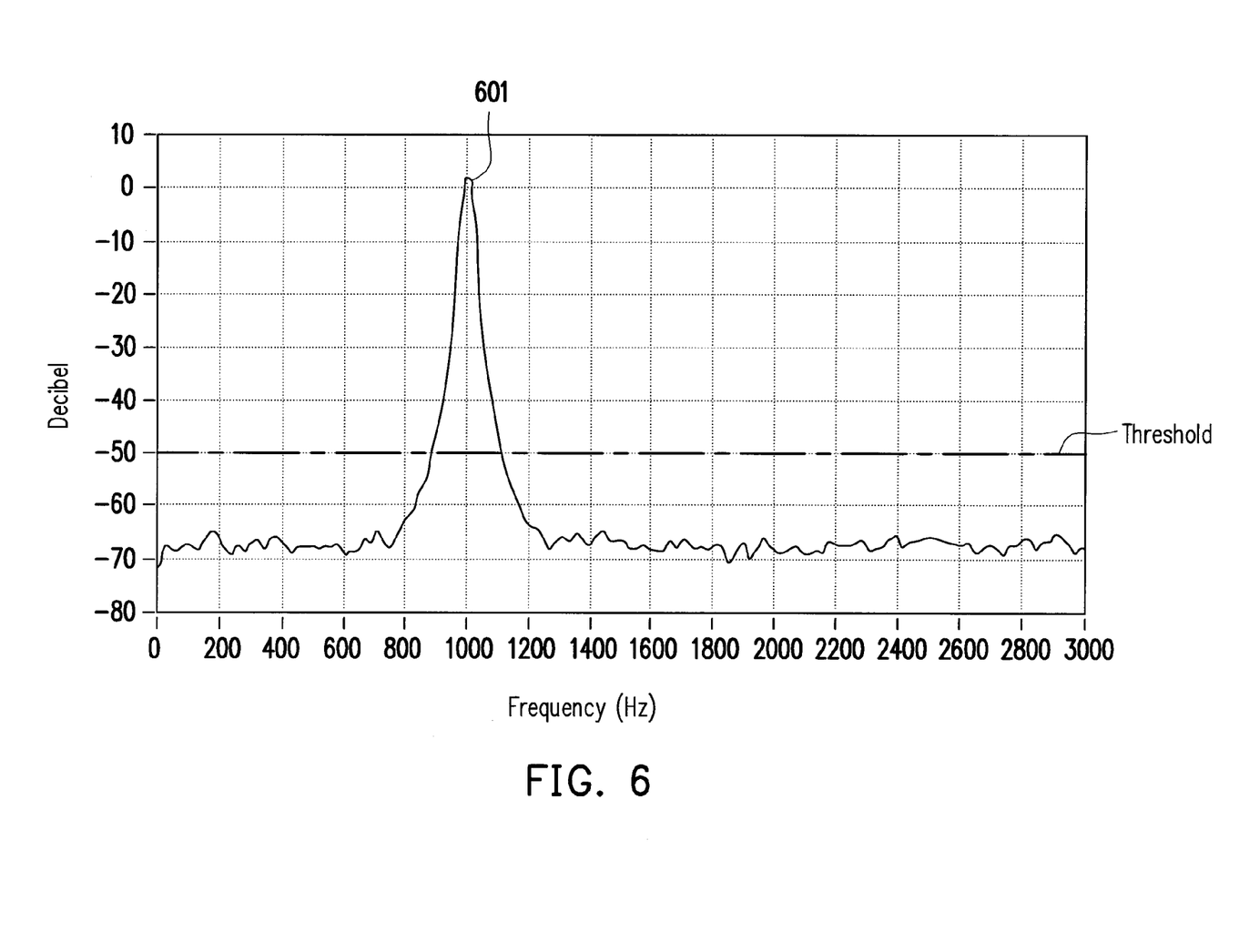
FIG. 6 is a schematic diagram of an audio testing spectrum according to an embodiment of the invention.

The method that the testing unit 60 analyzes the first response signal S3 and the second response signal S4 mentioned in the step S306 is described in detail below. Referring to FIG. 5 and FIG. 6, FIG. 5 is a flowchart illustrating a method for analysing a response signal according to an embodiment of the invention. FIG. 6 is a schematic diagram of an audio testing spectrum according to an embodiment of the invention. In FIG. 6, a horizontal axis represents frequency, and a vertical axis represents decibel. For example, when the tester tests the functions of the IP phone on a production line of a plant, the tester can first use an environment microphone 30 (for example, a directional/cardioid microphone) to measure sound signals in the environment to serve as environment reference signal and store the same in the testing unit 60 of the testing host 10. It should be noticed that when the environment microphone 30 is installed, the environment microphone 30 is preferably to be disposed away from the electronic device 40 to avoid mutual interference between the environment microphone 30 and the electronic device 40.

First, in step S502, the testing unit 60 respectively calculates a first difference value and a second difference value by subtracting the environment reference signal from the first response signal S3 and the second response signal S4. For example, it is assumed that the audio processing unit 20 sends the first audio testing signal S1 of 1K Hz, after the first audio receiving device 402 receives the first audio testing signal S1, the first response signal S3 generated in response to the first audio testing signal S1 is transmitted back to the audio processing unit 20 through the first loop 410 and the first audio sending device 406. Now, the testing unit 60 analyzes the first difference value (for example, a curve 601 shown in FIG. 6) obtained by subtracting spectrum distribution amplitudes of the first response signal S3 and the environment reference signal.

Then, in step S504, when the first difference value and the second difference value are greater than a threshold, it represent that the functions of the first audio receiving device 402, the second audio receiving device 404, the first audio sending device 406 and the second audio sending device 408 of the electronic device 40 are normal. For example, the testing unit 60 first determines whether a decibel of the curve 601 around 1K Hz is greater than a predetermined threshold (for example, 50 decibels), and analyzes whether a peak of the curve 601 falls around 1K Hz (for example, between 1K Hz±2 Hz). When the decibel of the curve 601 around 1K Hz is greater than 50 decibels, and the peak of the curve 601 falls between 1K Hz±2 Hz, it represents that the functions of the first audio receiving device 402 and the first audio sending device 406 of the electronic device 40 are normal. Conversely, it represents that the functions of the first audio receiving device 402 and the first audio sending device 406 of the electronic device 40 are probably abnormal. It should be noticed that considering an error occurred during the audio testing process, an error range of ±2 Hz is set when determining the peak of the curve 601. The error range of ±2 Hz is only an example, and in other embodiments, the error range can be adjusted according to an actual requirement to improve testing accuracy.

Finally, in step S506, when the first difference value and the second difference value are smaller than the threshold, the audio processing unit 20 respectively changes the specific frequencies of the first audio testing signal S1 and the second audio testing signal S2, and repeats the steps S302-S306 of the method for audio testing. For example, the audio processing unit 20 cannot directly determine that the functions of the first audio receiving device 402 and the first audio sending device 406 of the electronic device 40 are abnormal when the decibel of the curve 601 around 1K Hz is smaller than 50 decibels. In another situation, it is assumed that a plurality of audio testing apparatuses 100 simultaneously send the first audio testing signals S1 of 1K Hz to test a plurality of electronic devices 40 in the plant. Now, misjudgment is probably occurred. In order to avoid misjudgment, when the testing unit 60 calculates that the first difference value is smaller than the threshold, the audio processing unit 20 reselects randomly to change the frequency of the first audio testing signal S1 (for example, change the original 1K Hz to 2K Hz), so as to retest the electronic device 40. In this way, a chance of misjudgment is decreased. Similarly, the second audio receiving device 404 and the second audio sending device 408 of the electronic device 40 can also be tested according to the above method.

In the embodiment of the invention, following methods can be used to avoid the situation that the testing unit 60 test an error signal: (1) the audio processing unit 20 turns up sound volumes of the first audio testing signal S1 and the second audio testing signal S2 as much as possible; (2) the audio processing unit 20 generates the first audio testing signal S1 and the second audio testing signal S2 through a random selection method; (3) it is assumed that the audio processing unit 20 indirectly transmits the first audio testing signal S1 to the electronic device 40 (for example, transmits a sound signal by using a speaker) or indirectly receive the second response signal S4 (for example, receiving sound by using a standing microphone), and now the speaker and the standing microphone are preferably close to the electronic device 40 as far as possible; (4) it is assumed that when the first difference value calculated by the testing unit 60 is smaller than the threshold, the audio processing unit 20 has to change the frequencies of the first audio testing signal S1 and the second audio testing signal S2 and repeats the testing; (5) the environment microphone can be specifically used to detect a current environmental noise to serve as the environment reference signal of the testing unit 60.

According to a conventional IP phone testing method, the testing signal is pre-stored, and is played during the testing. However, in the method and apparatus for audio testing of the invention, the frequencies of first and second audio testing signals are randomly selected, and the first and second audio testing signals are sent without being pre-stored. Moreover, since the frequencies of the first and second audio testing signals are randomly generated, a chance of mutual interference of the frequencies occurred when a plurality of audio testing apparatuses simultaneously test the IP phones is decreased, so as to improve the testing accuracy.

In summary, in the method and the apparatus for audio testing of the invention, the first and second audio testing signals are sent to the electronic device, and the first and second response signals transmitted by the electronic device in response to the first and second audio testing signals are analyzed to test the function of the first and second audio receiving devices and the first and second audio sending devices of the electronic device. The method and the apparatus for audio testing of the invention may use a low cost sound card, microphone and loudspeaker to replace the high cost data acquisition (DAQ) card, artificial ear and artificial mouth. Besides, since the frequencies of the first and second audio testing signals are randomly selected, a chance of test error and distortion is decreased. On the other hand, according to the method and the apparatus for audio testing of the invention, the tester can test the electronic device under a noisy environment, and it is unnecessary to purchase expensive soundproof room to implement the testing, such that test cost is decreased, and convenience and practicality of testing are improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for audio testing, adapted to test an electronic device with a first audio receiving device and a second audio receiving device and a first audio sending device and a second audio sending device, the method for audio testing comprising:

sending a first audio testing signal and a second audio testing signal to the first audio receiving device and the second audio receiving device of the electronic device, wherein the electronic device has a first loop formed by electrically connecting the first audio receiving device and the first audio sending device, and has a second loop formed by electrically connecting the second audio receiving device and the second audio sending device, wherein the first audio testing signal and the second audio testing signal respectively have a specific frequency;

respectively sending a first response signal and a second response signal by the first audio sending device and the second audio sending device, wherein the first response signal and the second response signal are generated in response to the first audio testing signal and the second audio testing signal respectively passing through the first loop and the second loop; and receiving and analyzing the first response signal and the second response signal to test functions of the first audio receiving device, the second audio receiving device, the first audio sending device and the second audio sending device, wherein the step of receiving and analyzing the first response signal and the second response signal comprises:

respectively calculating a first difference value and a second difference value by respectively subtracting an environment reference signal from the first response signal and the second response signal;

when the first difference value and the second difference value are greater than a threshold, it represents that the functions of the first audio receiving device, the second audio receiving devices, the first audio sending device and the second audio sending device are normal; and respectively changing the specific frequency of the first audio testing signal and the second audio testing signal and repeating the method for audio testing when the first difference value and the second difference value are smaller than the threshold.

2. The method for audio testing as claimed in claim 1, wherein before the step of sending the first audio testing signal and the second audio testing signal, the method further comprises:

making the electronic device to form the first loop and the second loop.

3. The method for audio testing as claimed in claim 1, further comprising:

randomly selecting the specific frequency from a selected range; and generating the first audio testing signal and the second audio testing signal according to the specific frequency.

4. The method for audio testing as claimed in claim 1, wherein the first response signal is generated by the electronic device in response to the first audio testing signal, and the first response signal is output through the first loop of the electronic device and is sent by the first audio sending device.

5. The method for audio testing as claimed in claim 1, wherein the second response signal is generated by the electronic device in response to the second audio testing signal, and the second response signal is output through the second loop of the electronic device and is sent by the second audio sending device.

6. The method for audio testing as claimed in claim 1, wherein the step of sending the first audio testing signal and the second audio testing signal to the first audio receiving device and the second audio receiving device of the electronic device comprises:

simultaneously sending or selecting to send one of the first audio testing signal and the second audio testing signal to the first audio receiving device and the second audio receiving device of the electronic device.

7. An audio testing apparatus, comprising:

an audio processing unit, having a first output terminal, a second output terminal, a first input terminal and a second input terminal;

an electronic device, coupled to the audio processing unit, and having a first audio receiving device, a second audio receiving device, a first audio sending device and a second audio sending device, wherein the first audio receiving device is electrically connected to the first audio sending device through a first loop, and the second audio receiving device is electrically connected to the second audio sending device through a second loop, wherein the audio processing unit respectively sends a first audio testing signal and a second audio testing signal to the first audio receiving device and the second audio receiving device of the electronic device through the first output terminal and the second output terminal, wherein the first audio testing signal and the second audio testing signal respectively have a specific frequency, the audio processing unit respectively receives a first response signal and a second response signal from the first audio sending device and the second audio sending device of the electronic device through the first input terminal and the second input terminal, wherein the first response signal and the second response signal are generated in response to the first audio testing signal and the second audio testing signal respectively passing through the first loop and the second loop; and a testing unit, coupled to the electronic device and the audio processing unit, and respectively analyzing the first response signal and the second response signal received by the audio processing unit to test functions of the first audio receiving device, the second audio receiving device, the first audio sending device and the second audio sending device, wherein the testing unit respectively calculates a first difference value and a second difference value by respectively subtracting an environment reference signal from the first response signal and the second response signal, when the first difference value and the second difference value are greater than a threshold, it represents that the functions of the first audio receiving device, the second audio receiving devices, the first audio sending device and the second audio sending device are normal, and when the first difference value and the second difference value are smaller than the threshold, the audio processing unit respectively changes the specific frequency of the first audio testing signal and the second audio testing signal.

8. The audio testing apparatus as claimed in claim 7, wherein before the audio processing unit sends the first audio testing signal and the second audio testing signal, the electronic device forms the first loop and the second loop.

9. The audio testing apparatus as claimed in claim 7, wherein the audio processing unit randomly selects the specific frequency from a selected range, and generates the first audio testing signal and the second audio testing signal according to the specific frequency.

10. The audio testing apparatus as claimed in claim 7, wherein the electronic device generates the first response signal in response to the first audio testing signal, and outputs the first response signal through the first loop of the electronic device.

11. The audio testing apparatus as claimed in claim 7, wherein the electronic device generates the second response signal in response to the second audio testing signal, and outputs the second response signal through the second loop of the electronic device.

12. The method for audio testing as claimed in claim 1, wherein the audio processing unit simultaneously sends or selects to send one of the first audio testing signal and the second audio testing signal to the first audio receiving device and the second audio receiving device of the electronic device through the first output terminal and the second output terminal.

* * * * *